United States Patent [19]
Donahue et al.

[11] Patent Number: 5,694,334
[45] Date of Patent: Dec. 2, 1997

[54] METHOD AND APPARATUS FOR ELECTRONIC DISTRIBUTION OF DIGITAL MULTI-MEDIA INFORMATION

[75] Inventors: Paul Donahue, Moorpark; Lawrence Fish; Ian Lerner, both of San Diego, all of Calif.

[73] Assignee: Starguide Digital Networks, Inc., Reno, Nev.

[21] Appl. No.: 524,417

[22] Filed: Sep. 6, 1995

Related U.S. Application Data

[63] Continuation of Ser. No. 303,224, Sep. 8, 1994, abandoned.
[51] Int. Cl.$^6$ .................................................. H04B 10/00
[52] U.S. Cl. .............................. 364/514 R; 348/6; 348/7; 395/114
[58] Field of Search ......................... 364/514 R, 715.02; 348/6, 7, 16, 17; 370/355, 356, 367; 395/114

[56] References Cited

U.S. PATENT DOCUMENTS

| 4,544,950 | 10/1985 | Tu . | |
|---|---|---|---|
| 5,319,707 | 6/1994 | Wasilewski et al. | 380/14 |
| 5,375,068 | 12/1994 | Palmer et al. . | |
| 5,403,639 | 4/1995 | Belsan et al. . | |
| 5,440,336 | 8/1995 | Buhro et al. | 348/13 |
| 5,493,339 | 2/1996 | Birch et al. | 348/461 |

OTHER PUBLICATIONS

"A Systems Approach To Non–Transcoded Audio Delivery, A Step Toward Digital Compatability", by Richard J. Becvar, published in Annual Proceeding of the NAB, Mar. 20, 1994.

Primary Examiner—Emanuel T. Voeltz
Assistant Examiner—Thomas Peeso
Attorney, Agent, or Firm—McAndrews, Held & Malloy Ltd.; Robert C. Ryan

[57] ABSTRACT

A system and methodology for automatically organizing, managing, and distributing digital multi-media information without the negative artifacts which are normally introduced when electronically distributing digitally compressed data and information which contains still images, moving images and sound. The invented system packages and assists in production and electronic distribution of pre-produced multi-media information into digital packets or segments of varying file lengths with defined start and end points. Each segment of multi-media information is identified with separate alpha-numeric and binary coded data fields which are organized into multimedia "object descriptors" and multimedia "segment descriptors". Object descriptor fields define the actual multi-media object and its relative mixture of digitized audio, video, text, and picture content its life span for use, date and time release information for use, killdate, and file sizes. The "segment descriptor" information packet identifies the starting point of the segment, the ending point of the segment, the segment title and related information namely, the type and configuration of each multi-media information segment.

37 Claims, 7 Drawing Sheets

METHOD AND APPARATUS FOR ELECTRONIC DISTRIBUTION OF DIGITAL MULTI-MEDIA INFORMATION This application is a continuation of U.S. application Ser. No. 08/303,224, filed Sep. 8, 1994, now abandoned.

BACKGROUND OF THE INVENTION

The present invention is a system and methodology for automatically organizing, managing, and distributing digital multi-media information without the negative artifacts which are normally introduced when electronically distributing digitally compressed data and information which contains still images, moving images and sound. This type of digitized information, when stored, and particularly when transmitted between multiple locations, must be compressed due to the large amounts of storage space and transmission bandwidth or transmission time which would be needed if the information were transmitted in its uncompressed form. Further, due to compression algorithms usually employed, a significant loss of data is experienced each time the data is compressed, decompressed and then compressed again for transmission to another location. Such multiple compression and decompression cycles are frequently encountered when digitally encoding and electronically transmitting digitized audio, digitized pictures, and digitized video in environments such as syndicated radio transmissions, syndicated video transmissions, digitized training materials, digitized distance learning materials, digitized audio and video advertising material distribution, digitized music distribution, and digitized data transmissions.

The invented system is used to package and assist in production and electronic distribution of pre-produced multi-media information into digital packets or segments of varying file lengths with defined start and end points. The segmentation is done for the purpose of delivering the information in usable and interactive multi-media segments and for subsequently electronically transmitting the information packets to remotely located multi-media receiving and recording stations which include hardware and software specifically adapted to be used as part of the invented system. Each segment of multi-media information is identified with separate alpha-numeric and binary coded data fields which are organized into multimedia "object descriptors" and multi-media "segment descriptors". Object descriptor fields define the actual multi-media object and its relative mixture of digitized audio, video, text, and picture content its life span for use, date and time release information for use, killdate, and file sizes. The "segment descriptor" information packet identifies the starting point of the segment, the ending point of the segment, the segment title and related information namely, the type and configuration of each multi-media information segment (for example: each produced multi-media segment can consist of any combination of or exclusively of any single digitized information element such as digitized audio, digitized text, digitized pictures, digitized data, and/or digitized video). "Segment descriptors" also generate specific information relating to the multi media segment and are used to manipulate, store, and organize multi-media segments for transmission and later use. "Segment Descriptors" are used to define the length of the segment in bits, kilobits, megabits or gigabits, as appropriate and the multi-media information segments content, i.e. what combination of audio, video, pictures, data, and text is included in the segments. The multi-media information packets and segments descriptors are transmitted over available transmission system architectures such as satellites, fiber optic, cable and terrestrial wireless and wired circuits.

Optionally, the transmission and reception system bandwidth and speed of transmission requirements can be scaled automatically using the multiplexor 51, network segment producer 27, and local segment producer 21 to software configure and scale the data rate of the transmitting modem 31 and the receiving modem 55 is automatically bandwidth scaled with data from the command control information processor 35. This feature and invention permits system users to accommodate varying types of multi-media information for a low cost distribution, by the automated bandwidth, on-demand transmission scheme. This software configurable bandwidth on-demand feature permits many types of multi-media and data producers to utilize the same hardware, software and telecommunications system configurations cost effectively. For example one multi-media segment producer might use full motion MPEG video, MPEG audio, text, and pictures requiring a digital transmission speed of between 1.5 and 6.0 megabits per second whereas another multi-media segment producer might only use MPEG audio, text, and pictures, requiring a transmission speed of 128 kilobits per second for real time transmission. The described invention permits both producers to utilize the same hardware, software, and telecommunications systems without introducing technological obsolescence.

The segmented multi-media information is transmitted to remotely and geographically dispersed receiving stations which then store the information onto conventional computer storage media such as magnetic or optical hard disk for later playback. Additional commands can be delivered to the remote devices at the receiving stations which cause the remote devices to operate in either an unattended operation mode to play the stored files at a predetermined times and in a pre-arranged sequence or at convenient local time by interaction with a local user.

The invented system reduces negative artifacts which when introduced, accumulate and degrade or even destroy the integrity and quality of multi-media information which is electronically distributed using conventional distribution systems. The negative artifacts are normally introduced into such distribution systems during a process called "transcoding" or "stacked coding" which is the by-product process where digitally compressed multi-media information is encoded, compressed and then decoded and restored to baseband digital information multiple times in the process of preparing the information for transmission, the transmission itself, and the reception and recording or storage of the data. In a typical digital distribution system, the need to transfer digital multi-media information occurs several times and at several points in the transmission path.

The invented system has application whenever instant electronic distribution of digitized information is required or desired including radio network program distribution, advertising distribution, music distribution, video distribution, newsletter distribution, training material distribution, newspaper distribution, and other electronic distribution of information in areas such as home schooling and remote business training.

DETAILED DESCRIPTION OF THE INVENTION

Figure 1:
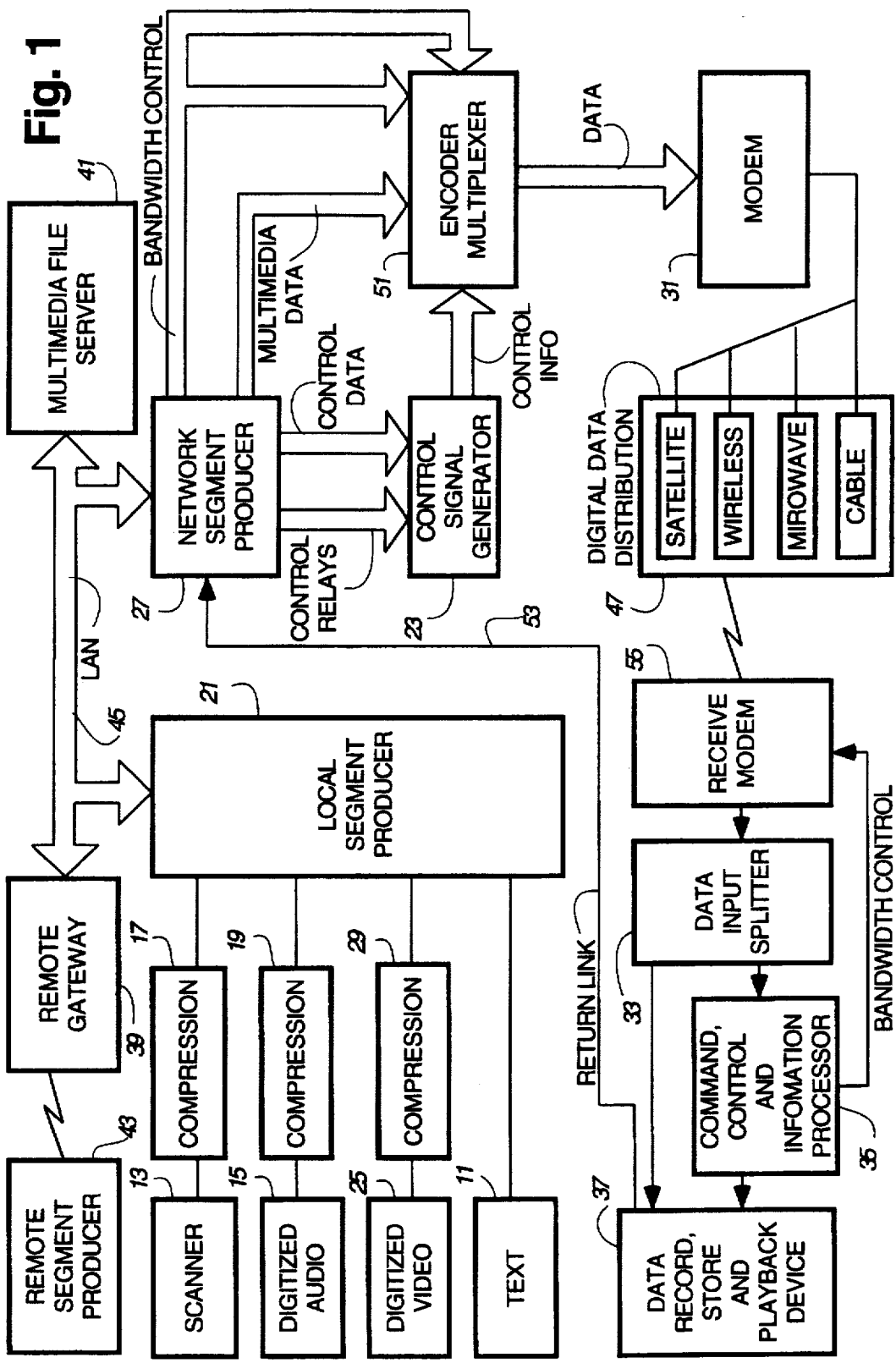
FIG. 1 is a block overview diagram showing the elements of the invented system

FIG. 1 is an overall block diagram showing the various components which may be utilized to organize, manage, and to distribute multi-media information using the invented system. Digitally encoded information is first produced and processed using digital audio/video components such as a word processor which outputs digitized text 11, e.g., an ASCII file created by a word processor or the like; a scanner 13 such as a commercially available Hewlett Packard scanner for creating digitized picture and line art files. Scanned information 13 is compressed using a commercially available compression product 17 such as an Iterated Technologies Fractel Geometry plug in PC circuit card and related commercially available software. The digitized audio information 15 is likewise compressed using a compression product 19 for audio such as CCS CDQ 2000 or Antex SX-23E MPEG PC plug in circuit card (depending on the type of audio compression desired i.e. Dolby, MUSICAM, apt X). The digitized video information 25 is likewise compressed using a compression product 29, such as Intel Indeo PC plug in card, Microsoft for Windows video plug in card, standard MPEG I or II video plug in cards or similar (depending on the type of video compression desired). The local segment producer 21 is a conventional 486 33 MHz personal computer. It first receives digitized and compressed multimedia input from 17, 19, and 29. This digitized information is organized and managed by software on local segment producer 21 to supply this multi media information data to the file server 41 which stores the multi-media information as files.

Additionally, the local segment producer 21 generates "object descriptor" and "segment descriptor" data fields in the form of software database records and also stores these on the file server 41 for the purpose of automatically software configuring the transmission system for bandwidth control, transmission scheduling, and the automated remote control of receiving devices using data input 55, 33, command control and information processor 35, and data record, store and playback device 37. These data base records are the basis of the actual "object descriptor" and "segment descriptor" data "field" which are transmitted by the network segment producer 27. These files are later processed by the command control and information processor 35 at the remote receiving site to cause the multi media information segments to be automatically digitally recorded or played on record, store and playback device 37.

Previously produced multi-media material or information is digitally stored at the multi-media file server 41 which is a commercially available 486 66 MHz personal computer which is configured with a high capacity SCSI digital read write data storage. This file server 41 is digitally linked by a commercially available Novell networking software and hardware 45 to the local segment producer 21 and network segment producer 27 and remote gateway 39.

In addition to receiving the digitized text, scanned information and digitized audio/video information (i.e., the multi-media information), digital signal multiplexor 51 also receives a data field "object descriptor" and "segment descriptor" from control signal generator 23, and a bandwidth on demand requirements signal from network segment producer 27 which is used to automatically scale the transmitting modem 31 and receiving modem 55. The digital encoder/multiplexor 51 combines the serial multi-media information data stream generated by the network segment producer 27 with the control information data stream generated by the control signal generator 23 and digital transmission bandwidth scaling data which is also applied to the modem 31. For purposes of audio, text and picture transmission at data rates of up to 512 kbits/sec a ComStream DAC 700 unit can be used for this encoding and multiplexing. For purposes of the higher bandwidth requirements (greater than 512 kbits) a ComStream CDM 101 will serve as encoder/multiplexor 51.

The remote telecommunications gateway 39 and remote segment producer 43 act in concert as a remotely located version of the local segment producer 21 and duplicate its functions exactly. Digitized and compressed audio 15, 19, pictures 13, 17, text 11, and video 25, 29 are assembled organized and managed through software in the remote segment producer 43 much as they are in local segment producer. The remote segment producer 43 delivers multimedia data files to the file server 41 through a common connection to the Novell Network by way of conventional ISDN lines, switch 56 lines, dial up telephone lines, T-1 and fractional T-1 lines, and or duplex satellite links. This remote segment producer unit permits field multi-media producers to deliver and distribute their produced material to a network of users who are receiving and remotely recording data on devices consisting of units 55, 33, 35, and 37.

The base band serial data stream which is comprised of compressed multi-media information data and "object descriptor" and "segment descriptor" data is provided to a transmitting modem 31 which is also a commercially available product, such as a ComStream CM701 for satellite, SA and GI modulators for cable, and other commercially available modulators, which receives the digitized band composite serial bit stream information and converts it to a form suitable for transmission by satellite, wired terrestrial communication, wireless terrestrial communication, microwave or cable to a remote station.

At the remote multi-media receiving station, the transmitted information is received by another modem 55 which converts the received data back to its original baseband form, without loss, which serial baseband data is then passed to data input and splitter 33. Data input and splitter 33 splits the data into two parts, passing one part to command control information processor 35 and the other part consisting of the actual multi-media information to data record, stored and playback device 37. Command control and information processor 35 extracts the control data information i.e. "object descriptors" and "segment descriptor" data field component of the signal for processing by a specially equipped 486 33 MHz personal computer. Data record, stored and playback device 37 is a 486 33 MHz personal computer configured with software and hardware to record, store interactively and play back the multi-media information based on commands contained in the object and segment descriptor data field. In one embodiment of the invention, a return link 53 is provided to send confirmation and error conditions generated by data record, store and playback device 37 to network segment producer 21 at the originating station.

This low data rate return link 53 operates from 2.4 kbits/sec to 128 kbits/sec bi-directional and will be used with software to generate performance and use affidavits about remote user access to distributed multi-media information and for these same end users to request the automatic electronic transmission of previously produced digitized multi-media segments to their individually addressed remote recording unit.

The elements of FIG. 1 which are unique to the present invention are local segment producer 21, network segment producer 27, remote segment producer 43, data input and splitter 33, command control and information processor 35, and the software/hardware of configuration data record, store and playback device 37, and the automated software/hardware scalable bandwidth on demand system. Implementation details regarding the foregoing components will now be described with reference to FIGS. 2–6.

Digital network segment producer 27 produces packetized multi-media information data files which are created using existing technology using well-known techniques, which data files are multiplexed with alpha-numeric encoded and binary encoded command codes. These command codes are used to automatically control the recording and storing of the multi-media information data files at remote geographically dispersed locations. By having command codes which are multiplexed with the data files rather than transmitted as separate data files, and by using the methods and systems of the present invention, the electronic distribution of the multi-media information is accomplished without transcoding or degrading the quality and integrity of the multi-media data and without requiring additional telecommunication channels.

For the most part, the various system components utilized to produce the encoded functional commands and provide the required multiplexing of commands with data and subsequent processing of the encoded commands utilize readily available personal computer platforms equipped with interface cards and software which provide the required functionality.

Local and segment producer 21 receives as inputs digitized text 11, digitized audio/video 15 and video 25, scanned output from compression device using software, local segment producer 21 from multi-media information into data files, assemble generates "object descriptor" and "segment descriptor" data record field for the database. This information from local segment producer 21 is conveyed to the multi-media file server 41 for temporary storage and subsequent transmission as controlled by the network segment producer 27. The network segment producer 27 may also receive a feedback signal 53 from data record, store and playback device 37 at a remote location. Network segment producer 27 uses the serial data inputs from the file server 41, noted above and data from optional return link 53, to create a record containing the object and segment descriptor data field with functional control information and information about the multi-media file which is then multiplexed with the actual multi-media information file which contains the multi-media information from devices 15 and 17 and digitized text 11. Network segment producer 27 then processes and creates segments of multi-media information which are to be transmitted. Each segment has a data field containing the object and segment descriptor, i.e., functional control information and information about the file, in addition to the data field containing the actual multi-media information. The number of segments produced depends upon the quantity of data to be transmitted, but each segment has a descriptor field portion and a data information portion, i.e. object and segment descriptor, header information multiplexed with the multimedia data information.

Figure 2A:
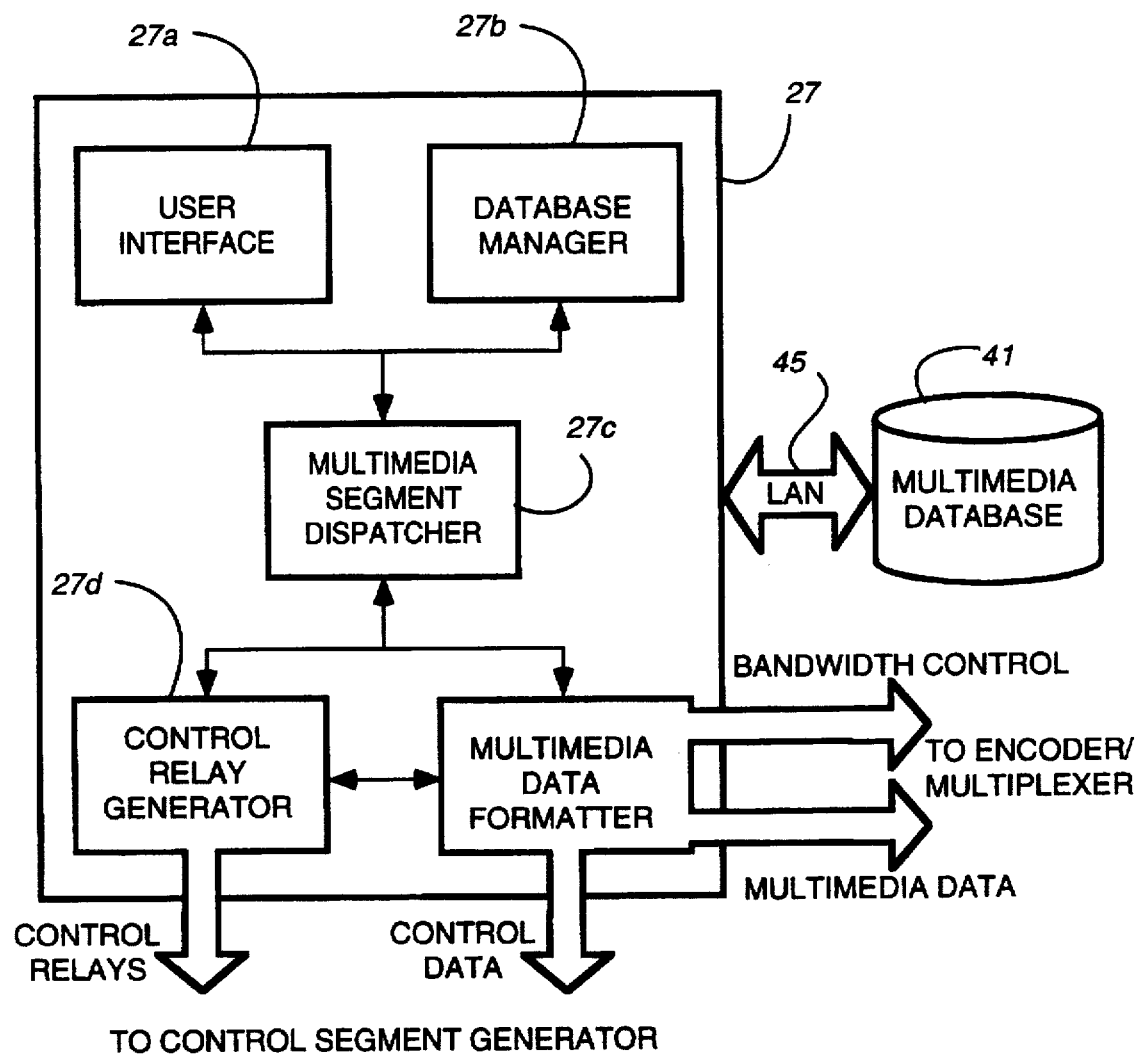
FIG. 2a is block diagram showing some of the functions performed by network segment producer 27.
Figure 2B:
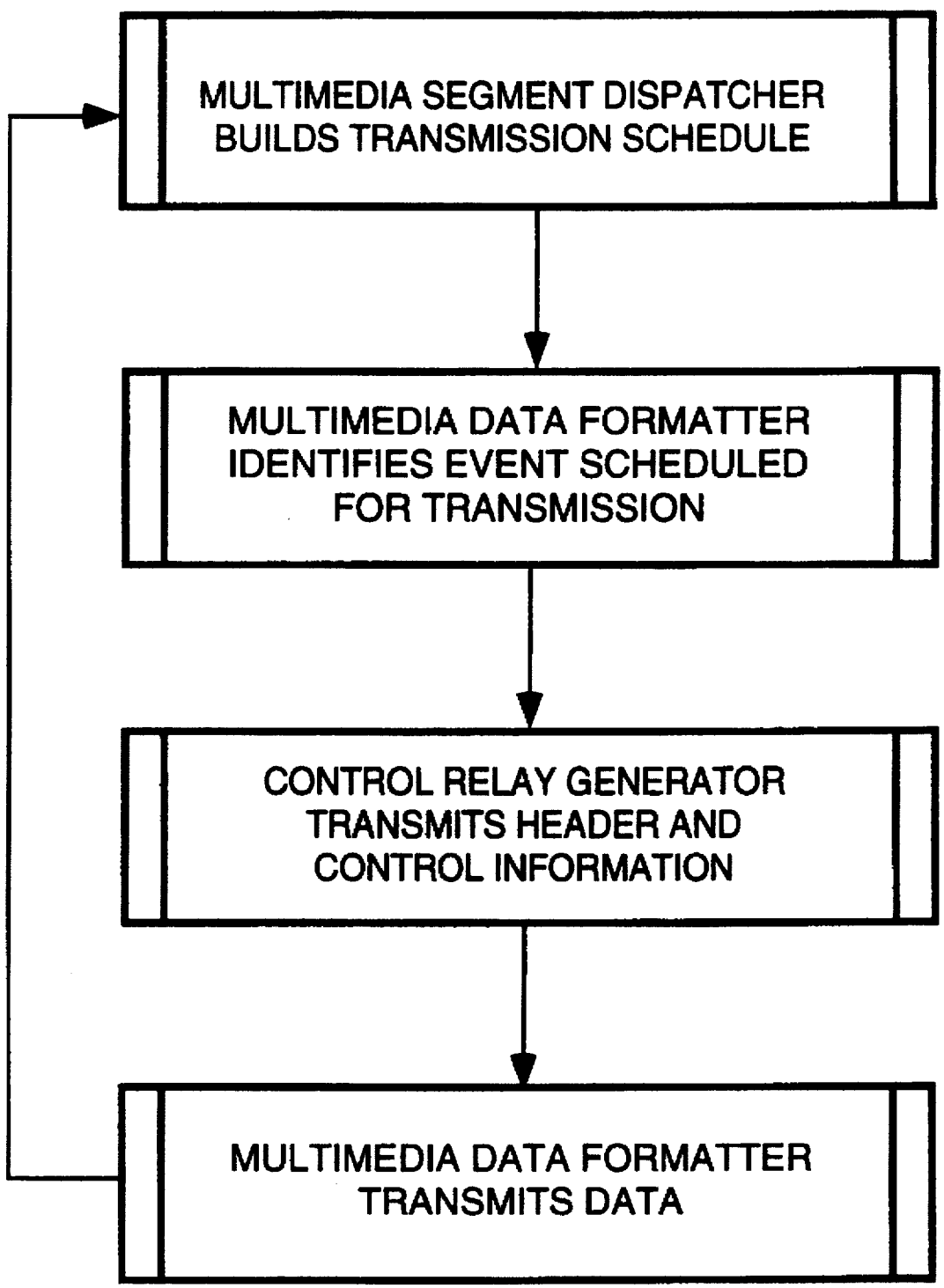
FIG. 2b is a flowchart of a computer program which performs the remaining functions performed by the network segment producer 27, and segment producer 21.

Referring now to FIGS. 2a and 2b, details regarding the processing of the inputs to digital signal multiplexor and segment producer 21 are as follows. FIG. 2a is block diagram showing some of the functions performed by digital signal multiplexor and segment producer 21.

The user interface 27a allows an operator to identify and interact with the function of the network segment producer. The interface identifies the segment being dispatched, the number of elements waiting to be dispatched and the number of times each element has been dispatched. The user interface is not critical to the operation of the network segment producer.

The database manager 27b is responsible for managing information concerning the segments which are stored on the multimedia file server. The database contains such information as segment name, date of creation, size, destination, etc.

The multimedia segment dispatcher 27c is responsible for assembling a list of segments which need to be dispatched or transmitted and selecting the next segment which needs to be dispatched. The list is assembled from existing segments which have been stored on the multimedia file server identified in the multimedia database 41, in addition to new segments which are introduced by of the local segment producers. The multimedia segment dispatcher selects a single segment to be transmitted based upon the relative urgency of all of the segments which need to be transmitted.

The control relay generator 27d identifies and delimits the beginning and end of segments which are transmitted by the multimedia data formatter. Specifically, the control relay generator provides synchronized relay contact closures with the beginning and end of the segment transmission. In addition, the multimedia data formatter generates control information (based upon the multimedia database) which identifies and announces each segments before it is transmitted.

FIG. 2b is a flowchart of a computer program which performs the remaining functions performed by network and segment producer 27.

The network segment producer is responsible for retrieving segments from the multimedia file server, and transmitting them to the encoder multiplexed. This task is accomplished as follows:

Based upon the segments which exists on the multimedia file server, build a list of segments which need to be transmitted. Prioritize the list considering the age of each segment, the number of times the segment has been transmitted previously, etc.

Select the most urgent segment to transmit.

Transmit the segment header information detailing the segment name, size, creation, etc.

Simultaneously activate a control relay (indicating the start of the segment) and begin transmitting the segment. At the end of the segment, activate a control relay (indicating the end of the segment).

The process is repeated by selecting and transmitting the next segment.

In cases where the low data rate feedback signal 53 is provided between a remote station and the network segment producer 27, the data signal multiplexor 51 and network segment producer 27 will process information and will software "reconfigure" subgroups of networks created by database on an ad hoc basis to activate only those data units which require specially requested or privately transmitted multi-media files. Feeds of this nature will use embedded alpha numeric permissioning codes in the remote units to initiate private reception and storage of this data.

Control signal generator 23 is typically implemented using a computer program which generates a command code, such as two ASCII characters which are used by the data record, store and playback device 37 at the remote station to:

1) begin recording or storing a transmitted file in its original data format;

2) confirm receipt of the transmitted data files;

3) end recording or storage of a transmitted file;

4) erase a file by name and size;

5) begin playing a file by name and size;

6) switch between direct playback of a transmitted file or playback from storage; and 7) order or reorder a sequence of transmitted files for later playback at predetermined times.

8) scale receiver bandwidth on demand

Of course, the particular codes utilized are not important so long as the command control and information processor 35 and data record, store and playback device 37 at the remote station are programmed to recognize the codes and process the information accordingly. Thus, the information which is input by the user and then put into a stream of characters which form the data files and headers are the command code itself, the name of a transmitted file, and the size of the transmitted file.

Figure 3:
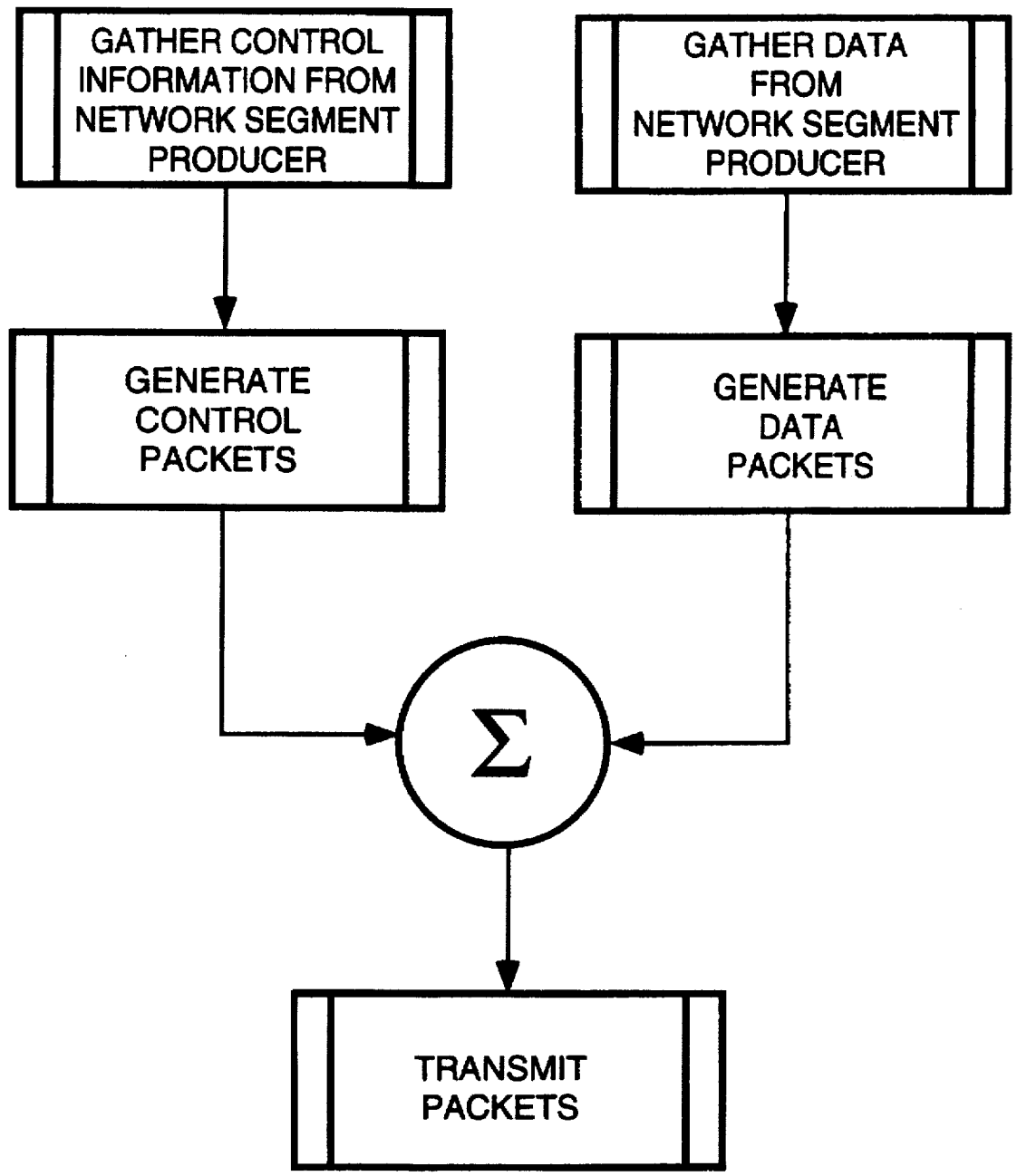
FIG. 3 is a flowchart of a computer program used to to illustrate a software implementation of control signal generator 23.

FIG. 3 is a flowchart showing a software implementation of control signal generator 23 files starting point, file ending point, file run time in minutes, file access availability period in days, file killdate, remote screen button location, remote screen button name, multi-media producer's name and related text information which describes the contents of the multi-media file, and transmission bandwidth requirement.

The control signal generator is responsible for transmitting formatted control packets which are comprised of relay control packets and header data packets.

Relay control packets are generated periodically or in direct response to stimulus (contact closures) provided by the network segment producer. The control signal generator will immediately build a relay packet due to a change in relay closures provided by the network segment producer.

Header data packets are generated in response to serial data provided by the network segment producer. The network segment producer generates a header which precedes the transmission of each segment. The header is gathered in by the control signal generated, re-packetized and queued for transmission by the control signal generator.

The packet summer (Σ) takes relay control packets and header data packets and merges them into a single output stream. Relay control packets have priority over header data packets.

Data input and splitter 33 is implemented as an interface card installed in an expansion slot in a general purpose personal computer such as IBM 386 or compatible. The expansion slot may be any slot suitable for handling a serial data card.

Figure 4:
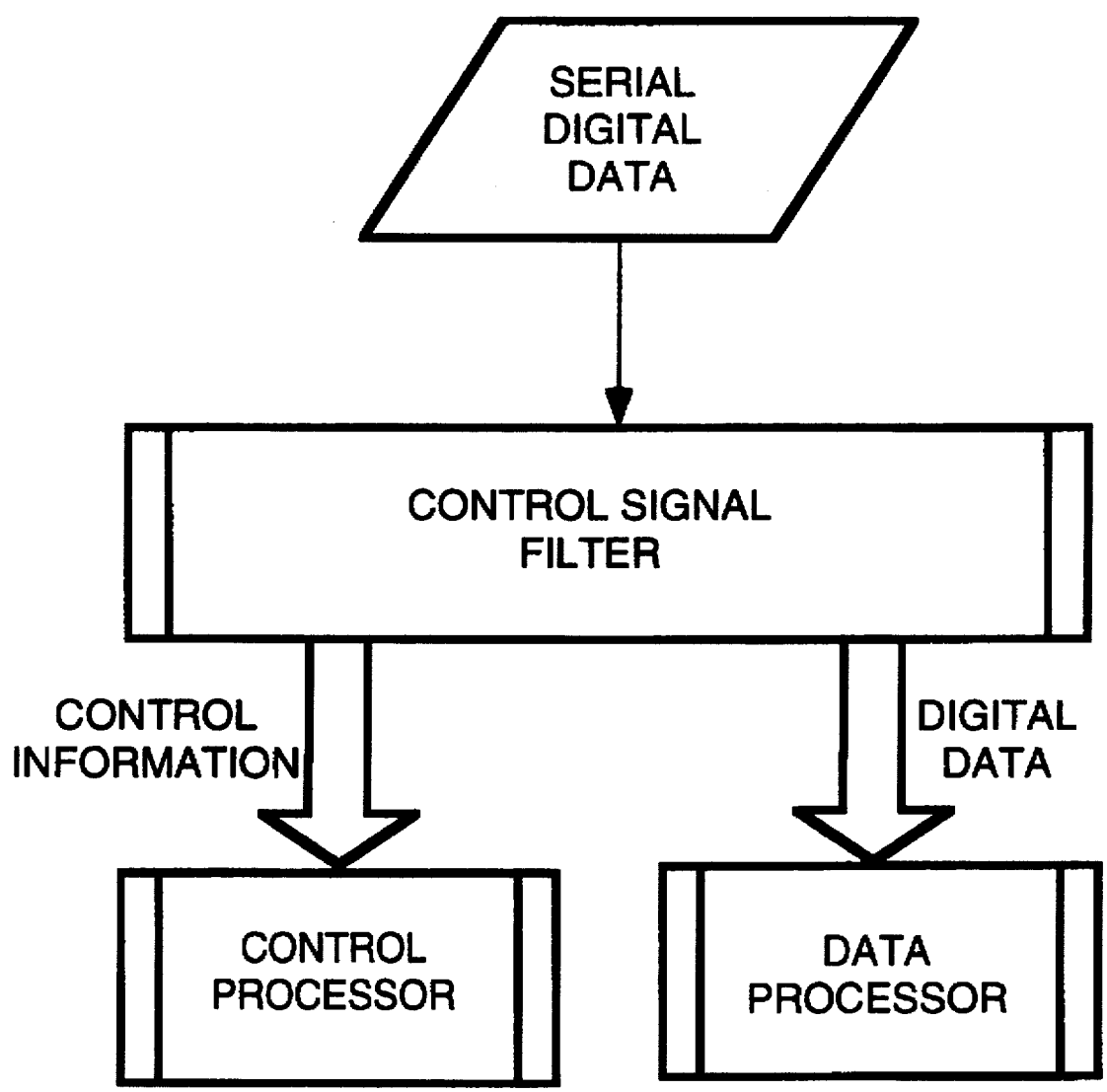
FIG. 4 is a block diagram showing the functions performed by data input and splitter 33.

FIG. 4 is a detailed block diagram showing the functional blocks of data input and splitter 33. In essence, data input and splitter 33 creates two data paths containing "object descriptor", and "segment descriptor data file" and multi-media information, one of which is input to command control information and information processor 35 and the other of which is input to data record, store and playback device 37. Command control information and processor 35 is another interface card which plugs into an expansion slot of an IBM 386 or compatible personal computer, which operates to separate the functional commands from the received information to produce an output that is the data header generated by control signal generator 23. The data header information and the second data stream from data input and splitter 33 are input to data record, store and playback device 37 which utilizes the commands from the data header to record and store the multi-media information input from data input and splitter 33 or for playing back multi-media information previously stored. Data record, store and playback device 37 also checks each segment which was received and provided by data input and splitter 33 using a checksum or equivalent technique to ensure that the received packet is the same as the transmitted packet. In the event that a complete and correct file transfer did not occur, an error flag is set which initiates an inquiry to the originating station via a telecommunications channel, dial-up phone line, terrestrial data link or return satellite link. The originating station then retransmits the segment received erroneously as described above.

The data input and splitter is responsible for separating the control information from the segment information. This is accomplished by deframing the incoming data stream, identifying the control information and stripping the control information out of the data stream. The remaining data is provided to the data processor while the control information is sent to the control processor.

Figure 5:
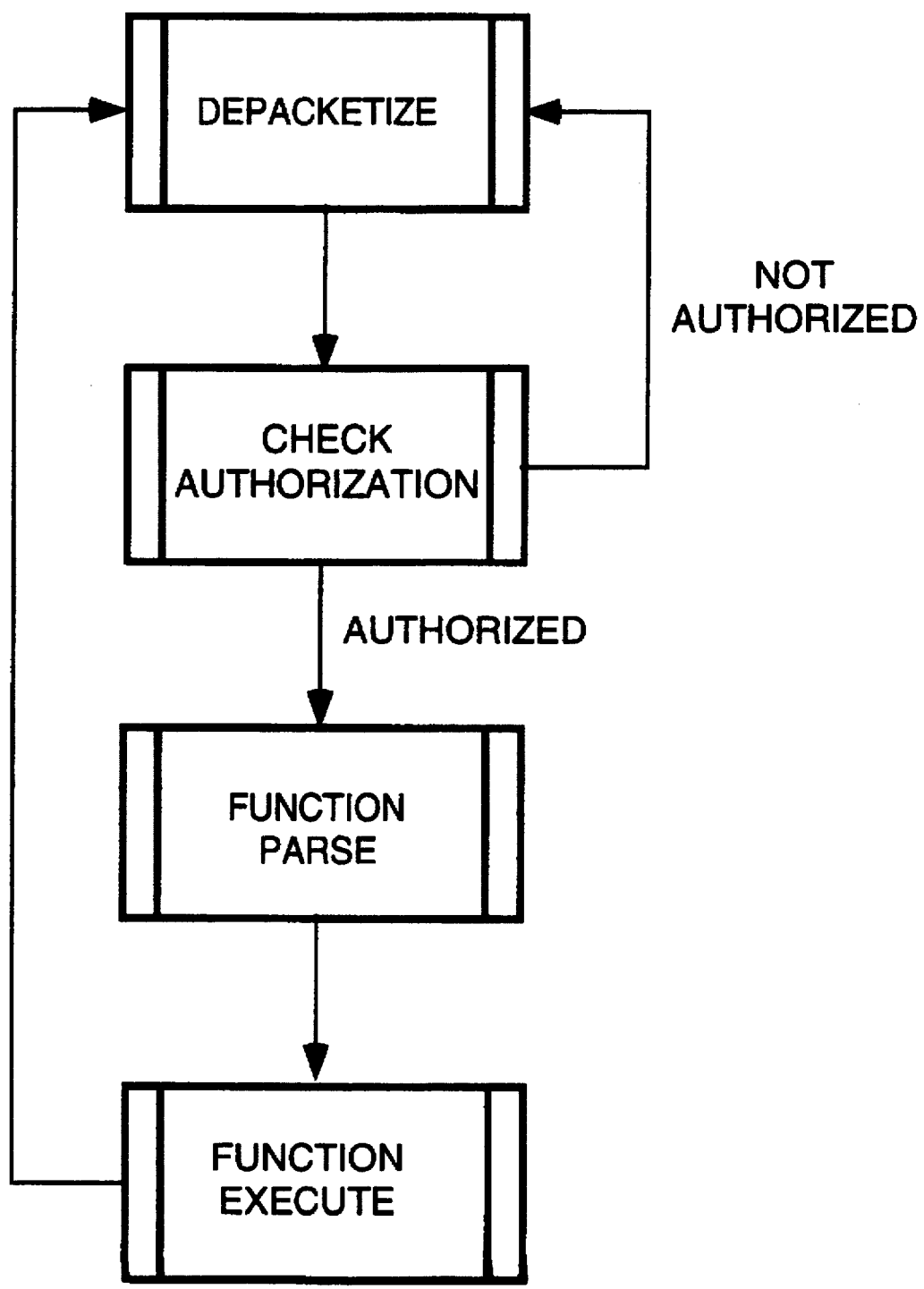
FIG. 5 is a block diagram showing the functions performed by command control and information processor 35.

Command control and information processor 35 may be implemented as an interface card which plugs into an expansion slot of and IBM 386 or compatible computer. FIG. 5 is a block diagram showing the various functions performed by command control and information processor 35.

The command control information processor is responsible for processing data gathered by the data input and splitter. Packets are assembled from the splitter and are processed by identifying the destination address and authorization. If the packet has been address to a receiving unit, the unit will continue to process the content of the command. Otherwise, the packet is discarded.

Figure 6:
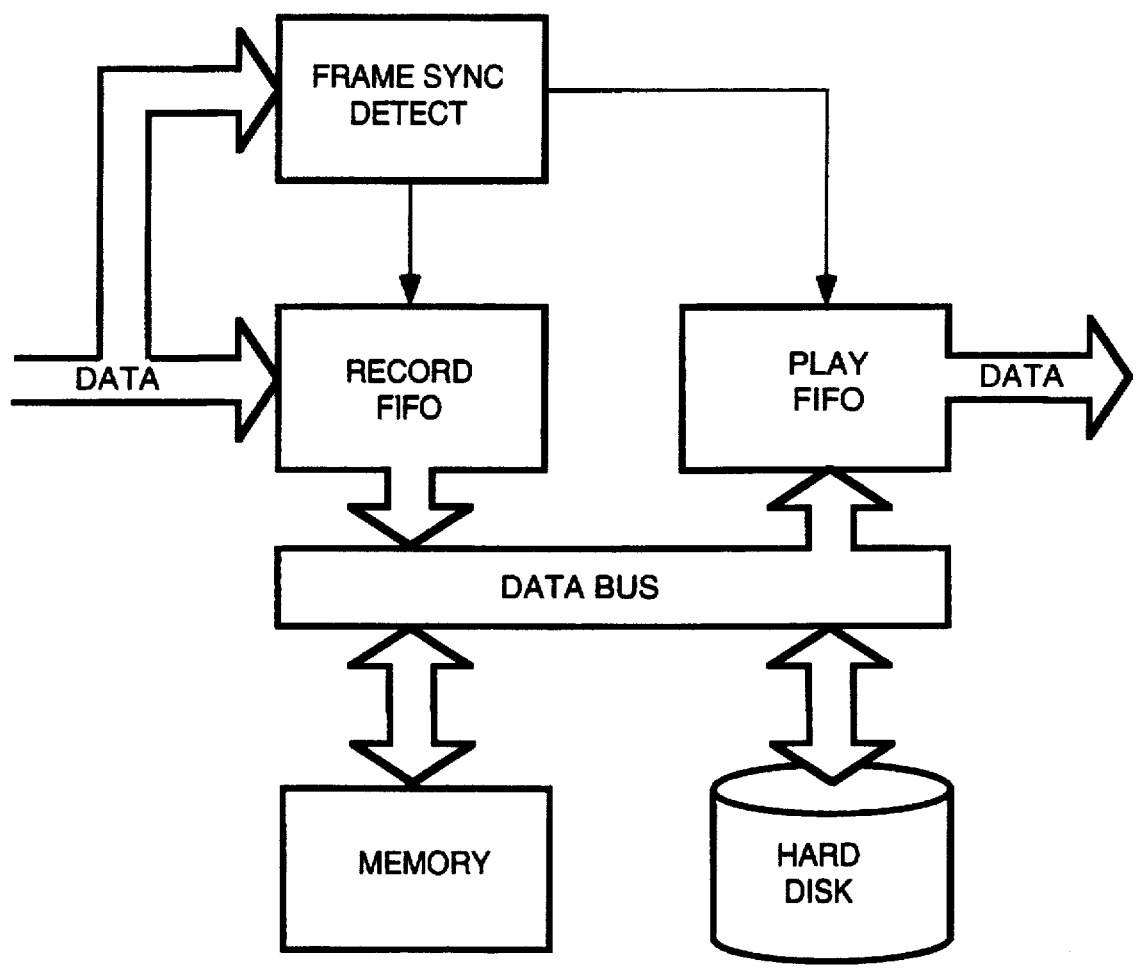
FIG. 6 is a block diagram of the serial data interface card which performs the function of processing the data and delivering the data for the remote data record, store and playback device 37.

Data input and playback device 37 is implemented as software and hardware which runs on commercially available personal computers such as an IBM 386 or compatible. FIG. 6 is a block diagram which shows the data flow and functional elements of record playback device 37.

The record/playback device is capable of receiving a high speed transmission, deframing the transmission so that it may be processed, and capable of forwarding the data either directly or indirectly to a non-volatile storage device such as a hard disk drive. Data enters the device and is examined for a marker which periodically occurs in the data. Once the marker has been detected, subsequent markers are detected until 'synchronization' is achieved. Once synchronized, frames enter the record FIFO and are transferred into memory. After a complete frame is in memory, the data input and splitter separates the frame into its constituent components, control and data, at which point the data may then be stored on the hard disk. In addition, data can be retrieved from the hard disk into memory, transferred from memory to the play FIFO at which point a previously stored data sequence has been successfully reproduced or played.

We claim:

1. An improved method of transmitting at least audio information from a head end to an end user distal from the head end, the improved method comprising the steps of:
   a. receiving a first analog audio signal and converting it into a digitized file comprising digitized audio information on the head end;
   b. compressing the digitized audio information using a single compression format of one of a plurality of compression formats;
   c. transmitting the compressed digitized audio information to an end user's apparatus without further compressing or decompressing the digitized audio information;
   d. storing the compressed digitized audio information on the end user's apparatus; and
   e. accessing the stored digitized audio information, decompressing the stored digitized audio information using said single compression format, and utilizing immediately thereafter the decompressed digitized audio information without further compression or decompression of the digitized audio in a time variable manner in response to a user initiated command in real time on the end user's apparatus.

2. The improved method of claim 1, further comprising the steps of: multiplexing, at the head end, the digitized audio information; and demultiplexing, at the end user's apparatus, the compressed digitized audio information without decompressing the digitized audio information.

3. The improved method of claim 2, wherein the decompressing of the stored and demultiplexed digitized audio information takes place on the end user's apparatus and yields a second analog audio signal representative of the audio information on the end user's apparatus.

4. The improved method of claim 3 wherein the transmission step includes transmitting the compressed, digitized audio information from the head-end apparatus, through an extra-terrestrial satellite, to the end user's apparatus.

5. The improved method of claim 4 wherein the compression step includes compressing the digitized audio information with an MPEG encoder; and the decompression step includes decompressing the compressed, digitized audio information with an MPEG decoder.

6. The improved method of claim 3 wherein the compression step includes compressing the digitized audio information with an MPEG encoder; and the decompression step includes decompressing the compressed, digitized audio information with an MPEG decoder.

7. The improved method of claim 2 including real time playback of the second analog audio signal on the end user apparatus so that a listener may hear the audio information in real time.

8. The improved method of claim 7 wherein the transmission step includes transmitting the compressed, digitized audio information from the head-end apparatus, through an extra-terrestrial satellite, to the end user's apparatus.

9. The improved method of claim 7 wherein the compression step includes compressing the digitized audio information with an MPEG encoder; and the decompression step includes compressing the compressed, digitized audio information.

10. The improved method of claim 2 wherein the compressing and multiplexing step also includes storing of the compressed, multiplexed, digitized audio information on the head-end apparatus for later transmission of the audio information.

11. The improved method of claim 10 wherein the compression step includes compressing the digitized audio information with an MPEG encoder; and the decompression step includes decompressing the compressed, digitized audio information with an MPEG decoder.

12. The improved method of claim 2 wherein the transmission step includes transmitting the compressed, digitized audio information from the head-end apparatus, through an extra-terrestrial satellite, to the end user's apparatus.

13. The improved method of claim 12 wherein the compression step includes compressing the digitized audio information with an MPEG encoder; and the decompression step includes decompressing the compressed, digitized audio information with an MPEG decoder.

14. The improved method of claim 2 wherein the compression step includes compressing the digitized audio information with an MPEG encoder; and the decompression step includes decompressing the compressed digitized audio information with an MPEG decoder.

15. The improved method of claim 1, wherein the decompressing of the stored digitized audio information takes place on the end user's apparatus and yields a second analog audio signal representative of the audio information on the end user's apparatus.

16. The improved method of claim 15 wherein the compressing step also includes storing of the compressed, digitized audio information on the head-end apparatus for later transmission of the audio information.

17. The improved method of claim 16 wherein the compression step includes compressing the digitized audio information with an MPEG encoder; and the decompression step includes decompressing the compressed, digitized audio information with an MPEG decoder.

18. The improved method of claim 15 wherein the transmission step includes transmitting the compressed, digitized audio information from the head-end apparatus, through an extra-terrestrial satellite, to the end user's apparatus.

19. The improved method of claim 18 wherein the compression step includes compressing the digitized audio information with an MPEG encoder; and the decompression step includes decompressing the compressed, digitized audio information with an MPEG decoder. with an MPEG decoder.

20. The improved method of claim 15 wherein the compression step includes compressing the digitized audio information with an MPEG encoder; and the decompression step includes decompressing the compressed, digitized audio information with an MPEG decoder.

21. The improved method of claim 1 wherein the compressing step also includes storing of the compressed digitized audio information on the head-end apparatus for later transmission of the audio information.

22. The improved method of claim 21 wherein the transmission step includes transmitting the compressed, digitized audio information from the head-end apparatus, through an extra-terrestrial satellite, to the end user's apparatus.

23. The improved method of claim 21 wherein the compression step includes compressing the digitized audio information with an MPEG encoder; and the decompression step includes decompressing the compressed, digitized audio information with an MPEG decoder.

24. The improved method of claim 1 wherein the transmission step includes transmitting the compressed, digitized audio information from the head-end apparatus, through an extra-terrestrial satellite, to the end user's apparatus.

25. The improved method of claim 24 wherein the compression step includes compressing the digitized audio information with an MPEG encoder; and the decompression step includes decompressing the compressed, digitized audio information with an MPEG decoder.

26. The improved method of claim 1 wherein the compression step includes compressing the digitized audio information with an MPEG encoder; and the decompression step includes decompressing the compressed, digitized audio information with an MPEG decoder.

27. The improved method of claim 1, wherein said compression step performs lossy, perceptual compression.

28. The improved method of claim 1, wherein said digitized file further comprises text information.

29. The improved method of claim 1, wherein the user initiated command is included in the digitized file.

30. The improved method of claim 29 wherein the user initiated command comprises a command to begin recording or storing a transmitted file in its original data format.

31. The improved method of claim 30 wherein the user initiated command comprises a command to confirm receipt of the transmitted data files.

32. The improved method of claim 30 wherein the user initiated command comprises a command to end recording or storage of a transmitted file.

33. The improved method of claim 30 wherein the user initiated command comprises a command to erase a file by name and size.

34. The improved method of claim 30 wherein the user initiated command comprises a command to begin playing a file by its name and size.

35. The improved method of claim 30 wherein the user initiated command comprises a command to switch between immediate playback of a transmitted file or playback from storage.

36. The improved method of claim 30 wherein the user initiated command comprises a command to order or reorder a sequence of transmitted files for later playback at predetermined times.

37. The improved method of claim 30 wherein the user initiated command comprises a command to scale receiver bandwidth on demand.

* * * * *